May 27, 1924.

T. L. FAWICK

TRANSMISSION

Filed Oct. 29, 1923    3 Sheets-Sheet 2

1,495,782

Witnesses:
W. F. Kilroy
Harry R. White

Inventor:
Thomas L. Fawick

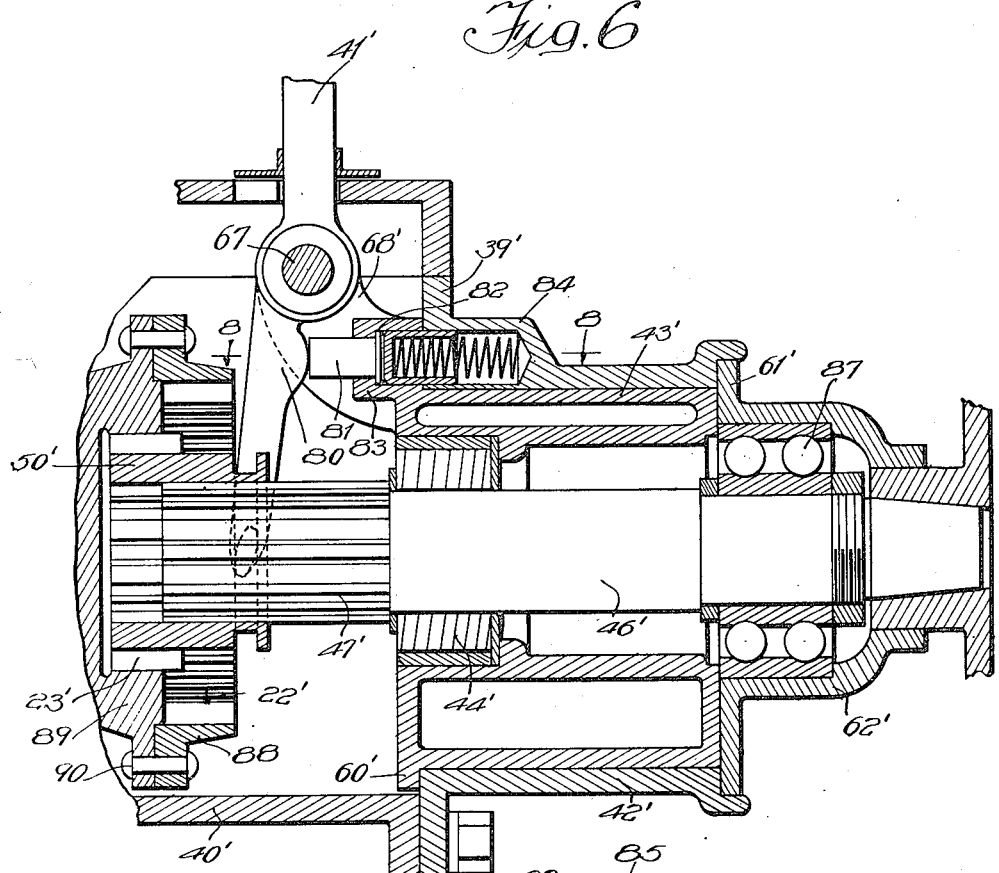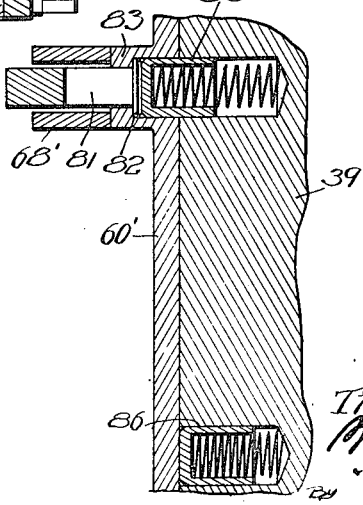

Patented May 27, 1924.

1,495,782

UNITED STATES PATENT OFFICE.

THOMAS L. FAWICK, OF RACINE, WISCONSIN.

TRANSMISSION.

Application filed October 29, 1923. Serial No. 671,317.

*To all whom it may concern:*

Be it known that I, THOMAS L. FAWICK, a citizen of the United States, residing at Racine, in the county of Racine and State of Wisconsin, have invented a certain new and useful Improvement in Transmission, of which the following is a full, clear, concise, and exact description, reference being had to the accompanying drawings, forming a part of this specification.

My invention relates to transmissions for motor driven vehicles. The invention is applicable to automobiles, trucks, tractors and the like.

It is well known that the present practice in automobiles provides generally a three-speed and reverse transmission of the selective type and a reduction at the differential of in the neighborhood of 4 to 1. This latter ratio permits the engine to develop its power at moderate speeds such as are normally employed for city driving.

For country driving it is necessary to go considerably faster to cover a suitable distance in reasonable time. This requires racing of the engine and where the engine is raced all day as it would be in a tour of any distance, it is subjected to vibration and excessive heating with consequent rapid deterioration. I have observed that it would be far better to provide some means which would permit the gear ratio of the rear axle to be changed so that when the car is driven on country roads the engine need not be raced, and yet high speed could be reached easily and quietly. For example, if the rear axle ratio could be changed to say, 3 to 1 instead of 4 to 1, it would be advantageous. Thus, if the rear axle normal ratio is 4 to 1 and assume the engine to run at a speed which moves the car at 25 miles per hour, it can be seen that a change of the ratio to 3 to 1 would at the same engine speed drive the car at 33⅓ miles per hour, and a ratio of 2½ to 1 would drive the car at 40 miles per hour.

I am aware that it is old to provide gears on the rear axle or closely adjacent the same for stepping up the speed of a vehicle, but that is not what I propose to do. Any weight added to the already too heavy rear axle is but piling Pelion upon Ossa. The rear axle should be as light as possible consistent with the necessary strength, and any means which permits of a reduction in the weight of the rear axle removes so much undesirable unsprung weight and makes the vehicle ride easier and more cheaply.

According to one form of my invention I employ a transmission which may be of the usual selective three-speed and reverse type (or any other preferred type) and a rear axle gearing which provides a relatively small reduction, for example, of the order of 3 to 1. In connection with the transmission, I provide auxiliary ratio changing gearing which comprises an internal gear on or connected to the driven shaft and a spur pinion upon the driving shaft, which latter shaft is a continuation of the engine shaft, and when the selective gear transmission is in third speed or direct drive, this auxiliary gearing gives a reduction of say, 4 to 3. Therefore, the total of both reductions is 4 to 1. Thus a part of the reduction between the engine and the driving wheel is secured in this auxiliary gearing and the remainder of the reduction is secured in the rear axle. In this respect the gearing is like that shown in my copending application No. 621,455, filed February 26, 1923. However, the internal gear of the auxiliary gearing has a central jaw clutch socket adapted to engage the pinion of the drive shaft to provide a direct drive as shown in my copending application No. 640,046, filed May 19, 1923. When the jaw clutch is thus engaged, the reduction of said auxiliary gearing is eliminated, and the reduction in the rear axle alone is employed. In the assumed case this would be 3 to 1. Thus, for normal city driving the two reductions may be employed and the car is lively and handles well through the lower speed ranges. For higher speeds the auxiliary gear reduction is eliminated and then the car can move rapidly with relatively low engine speed but with better economy and substantially free of vibration.

The mounting of the auxiliary gearing upon the transmission places it above the springs and it has an entirely different effect from being placed upon the rear axle, where the weight is unsprung and where it is peculiarly subject to abuse and lack of attention. In addition, no extensive operating means is required in my construction as is the case where the reduction is placed upon the rear axle or adjacent thereto. According to another way of constructing my invention tion, I may normally employ the entire reduction of say, 4 to 1 in the rear axle when the auxiliary gearing is driving straight through or on a 1 to 1 ratio, and then when the auxiliary gearing is introduced it gears up or increases the speed of the propeller shaft on a ratio of say, 3 to 4. The result is that when the auxiliary gear is thrown into action, the ratio between the engine and rear wheels is 3 revolutions of the engine shaft to 1 of the rear wheel. This latter scheme is generally more useful where most of the work is to be done at a relatively large reduction and the higher speed only occasionally required. The average car in city use or in hilly country would be thus arranged. Also in the case of trucks which carry relatively heavy loads, the low speed reduction of the rear axle would be employed normally and the high speed gear would be thrown into action when returning empty or when speed with light load is permissible.

According to my invention I provide an extension on the rear of the usual gear box or transmission housing, and in this extension mount an eccentric which carries a section of the propeller shaft. This shaft section carries one of the auxiliary gears, either the internal gear or the pinion, as the case may be, and such gear is shifted laterally by the eccentric and is shifted axially on the shaft section to mesh with the co-operating gear. A lever mounted on the eccentric serves to perform both motions and this lever works in a suitable slot or gate.

In order to acquaint those skilled in the art with the manner of constructing and operating my invention, I shall now describe a specific embodiment of the same in connection with the accompanying drawing in which:

Figs. 6 and 7 are fragmentary vertical and horizontal sectional views of a modification employing an interlocking mechanism for the movable gear member.

Figure 1:
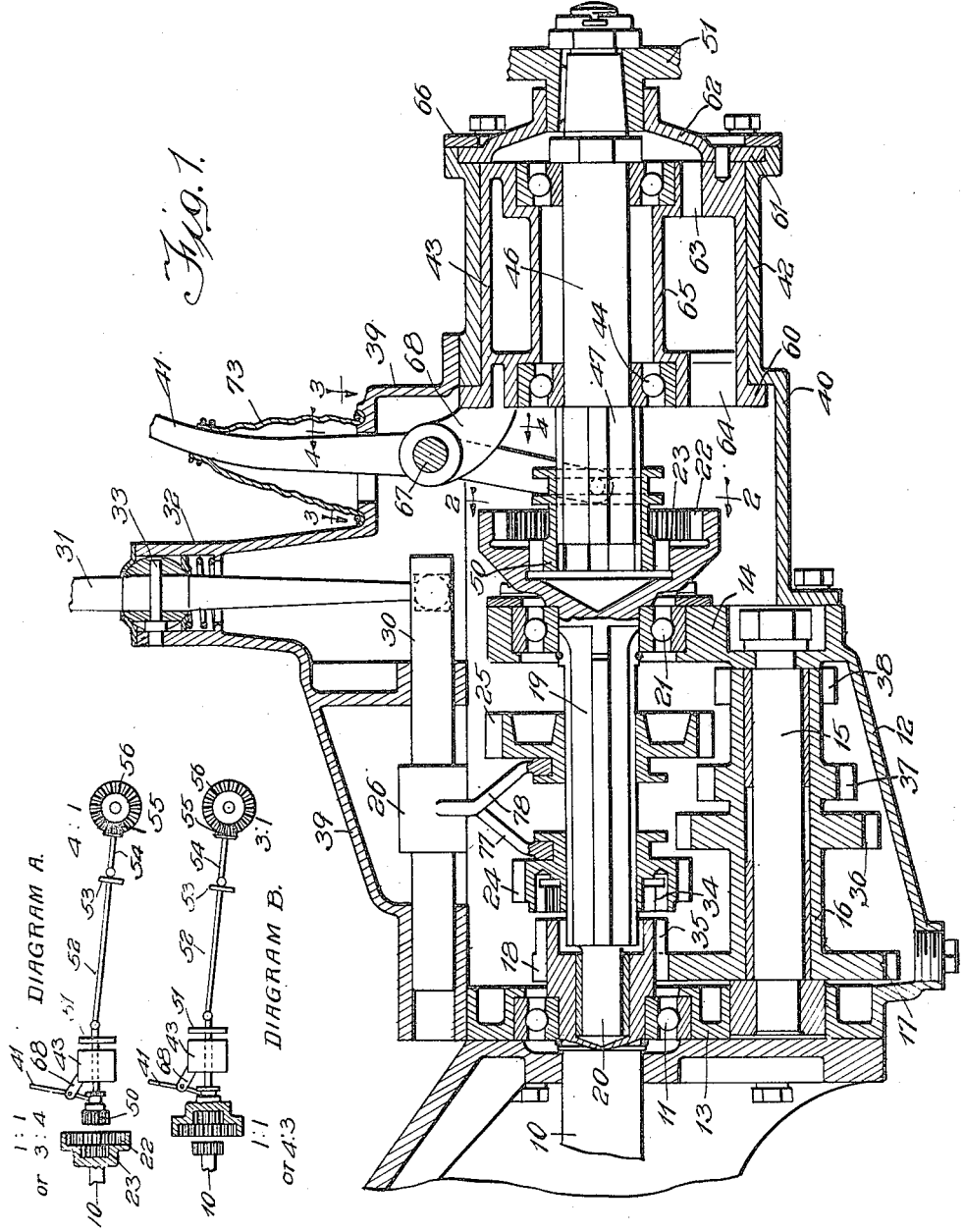
Figure 1 is a vertical longitudinal section through a transmission employing my invention.
Figure 2:
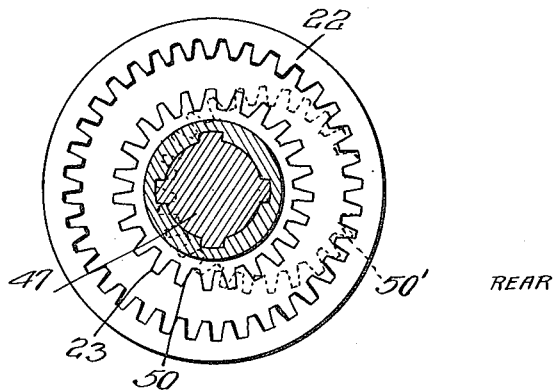
Fig. 2 is a transverse section taken on the line 2—2 of Figure 1.
Figure 3:
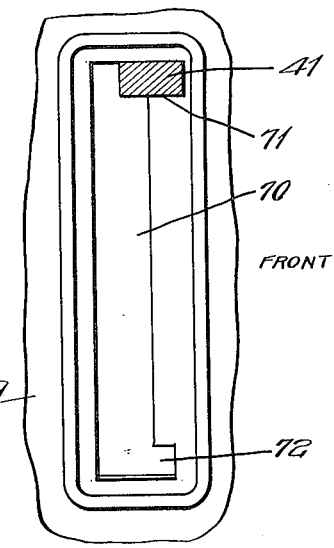
Fig. 3 is a fragmentary sectional view taken on the line 3—3 to show the operating lever and gate for shifting the movable gear.
Figure 4:
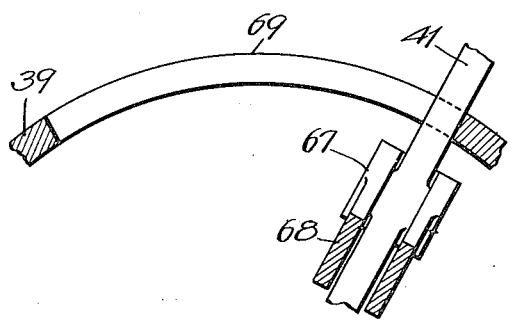
Fig. 4 is a similar fragmentary section taken on the line 4—4 to show the mounting of said lever in said slot.
Figure 5:
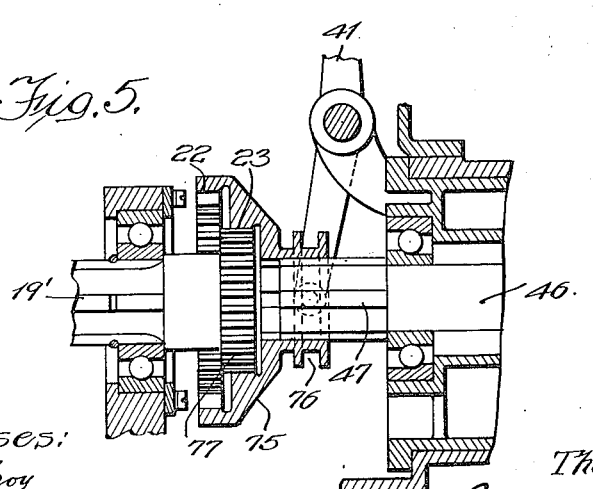
Fig. 5 is a fragmentary vertical longitudinal section through a modified form of gear where the normal driving ratio is partly in the auxiliary gear and partly in the rear axle.

Diagram A appearing on Sheet 1 is a diagram illustrating the connections and mode of operation of the form illustrated in Figure 1, and Diagram B also apearing on Sheet 1 is a diagram illustrating the connections and mode of operation of the form illustrated in Figures 5 and 6.

Referring now to the diagrams, Diagram A shows the construction where the rear axle has a relatively large reduction and the auxiliary gearing is normally employed simply as a straight clutch, but where when the higher speeds are to be attained, the auxiliary gearing is thrown into action to secure an increase of speed of the propeller shaft over that of the motor shaft or its extension. Thus, normally, the entire gear reduction is secured at the rear axle, and when it is desired to secure less of a reduction the auxiliary gear is thrown into action.

Diagram B illustrates the situation where the normal drive is through the auxiliary gearing which serves to produce a part of the total reduction, and where the reduction in the rear axle is not so large so that the total reduction is partly secured in the auxiliary gear and partly in the rear axle. When the higher range of speeds is to be attained, that is, less gear reduction, the auxiliary gear is employed merely as a straight clutch.

I shall now describe in connection with Figures 1 to 4 inclusive the form illustrated in Diagram A. The engine shaft or an extension thereof is indicated at 10 as mounted in the bearing 11 in the lower portion of the gear box or housing 12 which housing has a front wall 13 and a rear wall 14 for mounting suitable bearings as will be apparent later. These end walls are also useful in forming a closed container to hold grease or other lubricant.

A lay shaft 15 is secured in the end wall of the housing 12, and upon it is suitably journaled a compound gear 16 which may be made integral or which may be constructed of parts suitably connected together, this compound gear comprising a large gear wheel 17 meshing with the pinion 18 which latter pinion is fixed upon the end of the engine shaft 10. There is a stub shaft 19 which is mounted axially in line with the engine shaft 10 and forms a continuation of the same under certain circumstances, this stub shaft or motor shaft extension 19 having its forward end 20 journaled in a bearing formed in the end of the motor shaft 10 and having its rear end mounted in the roller bearing 21 in the rear wall 14. The stub shaft 19 is formed beyond the bearing 21 with an enlargement containing an internal gear 22 and an axial socket 23 which also has gear teeth of the same pitch and characteristics formed upon its inner periphery. The stub shaft 19 has two sliding gears 24 and 25 splined thereupon for slidable movement. These gears are adapted to be shifted by suitable sliders 26 having forks 27 and 28. The sliders in this case are mounted upon shaft 30 selectively operable by the suitable shift lever 31 mounted in the usual conning tower 32 through a universal ball and socket mounting 33. The shiftable gear 24 has formed in its left-hand side as viewed in Fig. 1 suitable clutch teeth 34 co-operating with similar teeth 35 formed upon the pinion 18. This pinion 24 also has spur teeth adapted to mesh with the teeth of the wheel 36 on the compound gear member 16. The slidable gear 25 is adapted slidably to mesh with either the gear pinion 37 mounted upon the compound gear member 16 or with a reverse gear which meshes with the pinion 38. Thus the usual three speeds forward and one speed reverse are provided for driving the stub shaft 19. When the motor shaft 10 and the stub shaft 19 are clutched together the transmission is in third or high speed.

Upon the rear wall of the housing 12, I have mounted an auxiliary housing 40 which thereby forms an extension of the housing 12. A common cover member 39 forms a suitable mounting for the conning tower 32 with its connected parts and for the auxiliary operating lever 41 as will be apparent from the following description. This cover 39 is clamped with the usual cap screws down upon the combined housing 12—40. The housing 40 has a barrel or cylindrical portion 42 at its rear end which forms a bearing for a suitable eccentric drum 43, this eccentric drum being cylindrical in its exterior peripheral surface, but having mounted eccentric thereto the roller bearings 44 and 45 for mounting a portion of the propeller shaft indicated at 46. This portion of the propeller shaft has suitable splines formed upon the forward end thereof as indicated at 47 for slidably mounting the pinion 50. This pinion has a shifting collar engaged by a fork formed on the lower end of the auxiliary gear shifting lever 41. The rear end of the propeller shaft section 46 has connected thereto a flexible joint 51 which flexible joint 51 connects with an intermediate portion of the propeller shaft 52 and through a second flexible or universal connection 53 with the rear axle pinion 55 and ring gear 56 in the differential (see Diagram A). It will be seen therefore that the shifting of the section 46 of the propeller shaft parallel to itself by means of the eccentric 43 does not interfere with its driving function.

The eccentric 43, which as previously stated has a cylindrical bearing in the barrel 42 is held against endwise movement by the shoulder 60 at the forward end and the flange 61 at the rear end which flange forms part of a cover 62, this cover being secured to the rear wall 63 which supports the bearing 45. The forward wall 64 supports the bearing 44 and a hollow tubular connection 65 serves to strengthen these walls and assists in withstanding the stresses due to the bearings 44 and 45. The walls 64 and 63 are perforated to permit of the passage of oil or grease therethrough. A flange ring 66 is connected to the rear end of the barrel 42 and it forms a retaining flange for the cover 62 and connected parts.

The eccentric 43 fits snugly in its barrel and it is adapted to be shifted or rocked by means of the handle 41 which is pivoted at 67 on a pin secured in the bracket 68 which bracket is an integral extension of the eccentric 43. It will thus be seen that the rocking of the drum 43 serves to shift the shaft section 46 laterally that is, parallel to itself, without disturbing the axial position of the slidable pinion 50.

The handle 41 moves in a U-shaped gate formed in the cover 39. This gate is formed in a cylindrical portion of the cover 39 as indicated at 69 in Figure 4. This part of the cover is concentric with the axis of the drum 42 and its cylindrical eccentric 43 so that as the eccentric is swung about in its cylindrical mounting the position of the lever 41 is relatively fixed with respect to its shiftable pinion 50 and the shaft section 46. The gate or slot 70 comprises a radial opening large enough to receive the lever 41 and it comprises in addition two end notches 71 and 72. The end notch 71 extends further to the rear to permit the teeth of the pinion 50 to mesh with the teeth 22 of the internal gear. The motion of the lever 41 in the slot or gate 70 is such that the pinion 50 is shifted back to its rearmost position to permit it to be swung laterally and then to mesh with the teeth 22 or 23 by axial movement. That is to say, the gears are slipped into and out of mesh axially and the pinion 50 is shifted only after it is out of line with the set of teeth 22 and 23 for lateral movement.

The slot or gate 70 may be closed by a piece of flexible material such as fabric, cloth and the like as indicated at 73 or a circular plate inside or outside of the curved portion 69 may be employed.

The operation of this device is readily understood from the foregoing explanation. Assuming as indicated in Diagram A that the entire gear reduction is normally secured at the rear axle and that the pinion 50 is normally plunged into the socket 23 for direct drive of the propeller shaft by the engine shaft. In this position the section 46 of the propeller shaft is axially in line with the stub shaft 19 and the engine shaft 10. The shiftable gears of the standard or usual gear box controlled by the shifting lever 31 operates in the usual manner without the employment of the auxiliary gear mechanism. As thus constructed the car operates in the normal manner and gives a very satisfactory operating characteristic for the lower range of speed. When a higher rate of speed is desired the auxiliary gear 50 is shifted from the central position as shown in Figure 1 where it is axially in line with the engine shaft 10 and the stub shaft 19. By a movement of the control lever 41 forward which withdraws the pinion 50 from its socket and throws it back to its rearmost position whereupon the lever 41 is swung laterally to rock the eccentric 43 until the pinion 50 comes into the dotted line position indicated at 50' in Figure 2, and the handle 41 comes opposite the notch 72 in the gate 70 whereupon the lever is pulled to the rear plunging the pinion axially into mesh with the teeth 22 of the ring gear and causing an increase in the relative speed of the propeller shaft for a given speed of the engine shaft.

Due to the internal gear teeth, a large meshing between the pinion 50 and said auxiliary internal gear is secured which provides for a very quiet, smooth, transmission of power. The extensive meshing of the teeth of the two gears provides great strength and since the gears both run in the same direction and are of no great difference in diameter, the operation is smooth and easy without excessive wear or noticeable backlash.

In Figure 5 I have indicated in a fragmentary manner the way in which the structure of Figure 1 may be modified to secure the combination shown in Diagram B. That is to say, normally, the auxiliary gear is in action and provides a portion of the reduction for the rear axle, but when the higher range of speed is encountered the auxiliary gear is cut out of action and direct drive substituted for this portion of the gear reduction. In that case the propeller shaft section 46 has upon its splined forward end a sliding internal gear and clutch 75 which has a shifting collar 76 engaged by suitable forks formed on the lower end of the lever 41 as in the construction shown in Figure 1. This slidable gear 75 has splines fitting the spline shaft 47 and has an internal gear with teeth 22' and a clutch socket with teeth 23 just as is shown in Figure 1 on the extension of the stub shaft 19. In that case, however, the stub shaft bears the internal gear and clutch socket, whereas in the construction illustrated in Figure 5 the stub shaft 19' bears a pinion 77 which is relatively stationary whereas the internal gear and clutch socket is laterally and axially movable to secure the different connections desired.

It is believed that the operation of this form of the device will be clear from Diagram B and Figure 5. Normally, a part of the gear reduction is secured in the auxiliary gear for the lower range of speeds, the standard or usual three-speed and reverse transmission being employed just as indicated in Figure 1. When the higher range of speed is to be employed, the auxiliary gear is merely a straight driving connection in clutch thereby cutting out a portion of the gear reduction, and the vehicle is driven at a higher rate of speed.

In Figures 6 and 7 I have indicated the preferred manner of holding the movable gear in either of its driving positions and for interlocking the same. That is to say, it is desirable first to hold the gear in a definite position and definite alignment before it can be plunged, and also it is desirable to compel a full plunging motion in either direction. To this end I provide an interlocking plunger pin shown in Figures 6 and 7. The rearwardly extending housing is divided into two sections, 40' and 42' which are separable along a line of cleavage which is also the line of cleavage between the two parts of the interlocking pin when the eccentric 43' is to be rotated. The eccentric 43 has a flange 60' which at the upper part is provided with the bracket 68' carrying the pin 67 which forms the pivot of the lever 41'. The portion of the lever below the pivot 67 is provided with an enlargement 80 which engages a plunger pin 81. This plunger pin 81 has a head 82 slidable in the counterbore of the lug 83 in which said pin 81 is mounted.

The section 42' of the housing is provided at suitable points with enlargements such as 84 to house two hollow spring pressed pins 85 and 86, these pins fitting in bores in said lugs corresponding in size and radial position to the size and radial position of the counterbore in the lug 83 of the eccentric drum 43'.

The propeller shaft 46' has roller bearings of cylindrical form as indicated at 44' for taking the radial thrust at the forward end of said eccentric 43' and has ball bearings 87 at its rear end, these bearings being suitably housed in the cap member 62' which has a flange 61' clamped to the end of the eccentric drum 43 and engaging a suitable surface on the housing section 42'. The forward end of the shaft section 46' has the splines 47' and the shiftable pinion 50' which is adapted to engage the teeth 22' of the internal gear 88 or the teeth 23' of the clutch portion. It will be observed that the clutch portion and the internal gear 88 are made of separate pieces suitably centered and riveted together as indicated at 90.

The pin 81 and the spring pressed pins 85 and 86 operate like the pin tumblers in a pin tumbler lock in that the pin 81 must be depressed to the line of cleavage between the flange 60' and the adjacent radial face of the housing portion 39', and then the drum 43 may be rotated on its cylindrical surface.

Thus the handle 41 must be so moved as to bring the pinion 50' clear of both gears before the drum can be moved or rocked rotarily. By the use of a suitable gate in which the handle 41 moves, plunging of the pinion 50' may be prevented at all times except when the pinion 50' is accurately aligned either with the internal gear 88 or with the clutch 89.

I do not intend to be limited to the precise details shown and described, nor to the gear ratios which I have indicated, these being by way of explanation and illustration. The particular form of three-speed and reverse transmission which I have illustrated is a suitable form, but I do not intend to limit the invention to this specific form only. In a similar manner I do not intend to limit the invention to the specific details of the mounting of the propeller shaft section 46 and its connected parts except as such limitations appear in the appended claims.

I claim:—

1. In combination, a gear box having a drive shaft, a countershaft, and a stub shaft, a housing secured to the end of the gear box, an eccentric in said housing, bearings in said eccentric, a driven shaft in said bearings projecting through said eccentric and adapted to be brought axially into line with the stub shaft or out of line with same by motion of the eccentric, said stub shaft and said driven shaft having a pair of co-operating gears comprising an internal gear and an external gear, said internal gear having a clutch recess adapted to co-operate with the external gear, one of said gears being axially slidable and a lever for rocking the eccentric and for shifting said axially slidable gear.

2. An auxiliary gear mechanism to be inserted in the drive shaft of an automobile between the usual transmission and the rear axle comprising, a housing, a pair of shaft sections extending into said housing, a relatively stationary mounting for the first shaft section, a relatively movable mounting for the second shaft section comprising an eccentric journaled in the housing, a pair of co-operating gears and clutch members for connecting said shaft sections, said members comprising an internal gear and an external gear, one of said members being slidable axially into and out of mesh with the other and means for rocking said eccentric and for moving the axially movable gear.

3. In combination, a housing having a barrel, an eccentric journaled for rotation in said barrel, a shaft section having bearings in said eccentric, a relatively stationary driving shaft, a gear casing for supporting the driving shaft connected to said housing, gearing between said shafts comprising an internal gear having a clutch and a cooperating external gear, one of said gears being splined upon said shaft section and the other gear being fixed upon the driving shaft.

4. In combination, a selective speed transmission having a casing open at the top and having end walls supporting bearings, a driving shaft mounted in one of said bearings, a stub shaft in the other bearing axially in line with the driving shaft, a supplementary gearing comprising a spur pinion and an internal gear, said latter gear having a clutch element co-operating with the pinion, a housing enclosing said supplementary gearing, an eccentric in the housing, bearings in the eccentric, a shaft section in the latter bearings, one of said gears being fixed upon the stub shaft, the other being splined upon the adjacent end of the shaft section and adapted to be shifted axially, and means for rotating the eccentric to bring the shiftable gear into line with the other gear and for plunging said shiftable gear into mesh with the other gear.

5. In combination, a selective speed transmission having a casing open at the top and having end walls supporting bearings, a driving shaft mounted in one of said bearings, a stub shaft axially in line with the driving shaft and mounted in the other bearing, a supplementary gearing comprising a spur pinion and an internal gear, said latter gear having a clutch socket co-operating with the pinion, an open top casing enclosing said supplementary gearing, an eccentric in said latter casing, bearings in the eccentric, a shaft section in the latter bearings, one of said gears being fixed upon the stub shaft and the other being splined upon the adjacent end of the shaft section, a cover for both of said casings, said cover supporting a manual shifting member for the selective speed transmission, means for rotating the eccentric to bring the shiftable gear into line with the other gear and for plunging said shiftable gear into mesh with the other gear, said means comprising a handle projecting through said cover.

6. In combination, a change speed gear box having a drive shaft, a countershaft and a stub shaft and having gears between said shafts, a housing secured on the end of the gear box, a laterally shiftable carriage pivoted on said housing, a driven shaft having bearings in said carriage and laterally movable therewith, said shaft projecting into said housing, said stub shaft also projecting into the housing, gears between the stub shaft and the driven shaft comprising an external gear and an internal gear, one of said gears being fixed upon the stub shaft, and the other of said gears being splined upon the driven shaft.

7. In combination, a change speed gear box, a drive shaft and a driven shaft extending from said box, an intermediate shaft in line with the drive shaft and adapted to be connected thereto through variable driving ratio mechanism, an internal gear on said intermediate shaft and an axially shiftable pinion meshing with the internal gear mounted on said driven shaft, said internal gear having a clutch socket engageable with said pinion and a swinging carriage for the driven shaft pivoted on an axis parallel to the axis of the driven shaft.

8. In a transmission, a gear box, a drive shaft and a driven shaft extending out of said box, an intermediate shaft disposed within the box, said driven shaft having an axially slidable external spur pinion within the gear box and said intermediate shaft having an internal gear having a central clutch socket adapted to co-operate with said external gear, means for selectively meshing the external spur gear with the clutch socket or with the internal gear, and change speed gears between said drive shaft and said intermediate shaft.

9. In a motor vehicle, a drive axle having a drive wheel, a gear box remote from said wheel and axle, a propeller shaft between the gear box and the drive axle having a flexible joint adjacent the axle and a flexible joint adjacent the gear box, this gear box comprising two sets of gears therein, one set being selective change spur gears for varying the driving ratio and direction, the other set comprising an external spur pinion and an internal gear having a central clutch socket, means for selectively meshing the external spur gear with the internal gear or with said clutch socket, said means moving the forward end of the propeller shaft laterally.

10. In a transmission, a gear box, a drive shaft, selective change gear mechanism in the gear box, a driven shaft, an internal gear and co-operating spur pinion between said selective change gear mechanism and said driven shaft, and a housing secured to one wall of the gear box forming a gear box for the internal gear and pinion, and an eccentric drum having bearings for said driven shaft, said eccentric being mounted in said housing.

11. In a transmission, the combination of a driving shaft and a driven shaft, a compound housing, an intermediate shaft and a lay shaft, said compound housing mounting the driving shaft, the lay shaft and the intermediate shaft and enclosing selective change speed and direction gear mechanism comprising selective external spur gears and shifter mechanism including a shifter handle having the usual movement in a path shaped like an H, change speed mechanism in another part of said compound housing enclosing an internal gear with a central clutch socket and an external spur pinion adapted to mesh with either the internal gear or the clutch socket, a laterally shiftable carriage in said portion of the housing having bearings mounting the driven shaft, and means for selectively meshing the external spur pinion with either the internal gear or the central socket, said means comprising a handle having a movement in a U-shaped path.

12. A driving shaft, an intermediate shaft and a driven propeller shaft, change speed mechanism between the driving shaft and the intermediate shaft comprising a sliding gear transmission employing shiftable external spur gears and a second change speed mechanism between the intermediate shaft and the driven shaft comprising an external spur pinion and an internal gear having a central clutch socket adapted to co-operate with the spur pinion, the driven shaft being mounted for lateral parallel movement, and a common rigid supporting member having bearings for each of said shafts.

13. In combination, a driving shaft having an internal gear and a central clutch member, a driven shaft having a pinion adapted for operative engagement with either the gear or the member, a carriage for moving said driven shaft laterally for bringing the pinion into alignment with the gear or clutch member, means for plunging said gear and a sectional interlocking plunger for holding the carriage against movement until the pinion is withdrawn from operative engagement with the gear or clutch member.

14. In combination, a driving shaft having an internal gear and a central clutch member, a driven shaft having a pinion adapted for operative engagement with either the gear or the member, a carriage for moving said driven shaft laterally for bringing the pinion into alignment with the gear or the clutch member, means for plunging said gear into operative engagement and for withdrawing the same, and an interlocking plunger for holding said means against plunging movement until the carriage is in position corresponding to alignment of the pinion with either the gear or clutch member.

15. In combination, a gear box having a drive shaft, a counter-shaft and stub shaft axially in line with the drive shaft, a housing secured to the end of the gear box, a driven shaft, an angularly movable carriage pivoted on an axis parallel to the axis of the driven shaft and eccentric thereto, bearings for said driven shaft in said carriage, said driven shaft being adapted to be brought axially into or out of alignment with the stub shaft by angular motion of said eccentrically pivoted carriage, said stub shaft and said driven shaft having a pair of cooperating gears comprising an internal gear and an external gear, said internal gear having a clutch recess adapted to cooperate with the external gear, one of said gears being axially shiftable and a lever for rocking the carriage about its pivot and for shifting said axially slidable gear.

16. In an automobile, an engine housing, a gear set attached at its forward end to the engine housing, said gear set comprising a driving shaft, a lay shaft and a stub shaft axially in line with the driving shaft, said gear set comprising a casing having bearings for said shafts, gears connecting said shafts, and a shift lever for changing the connections of said shafts thru said gears, a propeller shaft divided into three sections, flexible joints between said sections, means rigid with the casing for supporting the first propeller shaft section and for shifting the same laterally parallel to itself, and gearing connecting the stub shaft and the front section of the propeller shaft, said gearing comprising an external gear and an internal gear of larger diameter with a central clutch socket, one of said gears being axially movable into mesh with the other.

17. In combination, a primary gear set comprising a gear box with a driving shaft, a lay shaft, and a counter-shaft with change gears connecting them, an auxiliary gear set bolted directly upon the rear end of the primary gear set, said auxiliary gear set comprising a gear box with a driven shaft therein, an eccentrically pivoted carriage for said driven shaft, gears connecting the stub shaft of the primary set with the driven shaft of the auxiliary set, said gears comprising an external gear and an internal gear with a central clutch recess for engaging the external gear, a cover member, a manual shift lever for the primary gear set mounted in a universal joint in said cover, and a manual shift lever for the auxiliary set back of said first shift lever projecting through the cover, said latter lever having a movement different from the movement of the first shift lever.

18. In a motor vehicle, the combination of a standard change gear set employing sliding external gears and having a shift lever mounted in a universal joint, an auxiliary change gear set connected to said standard gear set and mounted rigid with and at one end of the standard change gear set, said auxiliary set employing an external gear and an internal gear with a central clutch recess, a pivoted carriage for shifting one of said latter gears laterally and means for plunging it axially into mesh with the other gear, a driving shaft connecting one of said gear sets with the engine and a driven or propeller shaft connecting the other gear set with the rear axle.

In witness whereof, I hereunto subscribe my name this 25th day of October, 1923.

THOMAS L. FAWICK.